UNITED STATES PATENT OFFICE.

JAMES H. W. HUCKINS, OF BOSTON, MASSACHUSETTS.

IMPROVED TOMATO SOUP.

Specification forming part of Letters Patent No. 47,545, dated May 2, 1865.

*To all whom it may concern:*

Be it known that I, JAMES H. W. HUCKINS, of Boston, in the county of Suffolk and State of Massachusetts, have invented a new and useful or improved composition of matters, which may be termed "Tomato Soup," and I do hereby declare the same, or the materials of which it is composed and the mode of compounding them, to be described as follows, viz:

Take a stock-boiler that will hold about twenty gallons. Put into it fifty pounds of beef-shin to fourteen gallons of cold water. Boil it, partly uncovered, for fourteen hours. After the water has partly boiled away add a little hot water from time to time, as it may require. After it has boiled the required time take it from the fire and add to it one quart of cold water. Afterward let it stand for ten minutes. Next, skim off all of the fat and strain the liquor from the meat through a fine sieve, and we shall have very nearly seven gallons of the liquor. Should there be more than seven gallons of the liquor, boil it down to the required quantity, but should there be a less amount, add the difference in hot water. This is called "stock." Next, take one bushel and a half of tomatoes, put them into a boiler, mash them up a little, and let them boil in their own liquor for one hour and a half. Next, strain them through a fine sieve—fine enough to stop the seeds and the skins. All the rest of the tomato must go through the sieve, after which we shall have about six gallons of the tomato liquor. If more than six gallons, boil it down to such amount. If less, add more tomato. Next, mix the stock and the prepared tomato together, and keep the mixture somewhat under a boiling temperature until wanted for further action. Next, prepare the following vegetables: Peel and weigh one pound and a half of onions, the same amount of turnips, one pound and three-quarters of carrots, and one pound of beets. Chop them all together quite fine. Next, take a soup-boiler that will hold sixteen gallons. Put into it three and a half pounds of butter. Next, add the chopped vegetables. Put the boiler on a hot fire, and cook the vegetables well. Next, add to them three and one-quarter pounds of flour, and thoroughly mix the whole together while hot. Next, take the boiler from the fire and let it cool a little. Next, add one ounce of black pepper, one-half a pound of fine salt, and three-quarters of a pound of brown sugar. Mix the whole well together, and add the mixture of beef-stock and tomato. The composition must now be well stirred for about ten minutes, and afterward put on the fire and stirred until it may boil. Continue to let it boil, and skim it for about five minutes, after which strain it through a fine sieve, but do not press the vegetables through the sieve. The composition will then be ready for the table, or for being hermetically sealed in cans. The amount of the preparation (which I term "tomato soup") so made will be about thirteen gallons. It is a composition containing preservative qualities, which will prevent it from decomposition for a great length of time.

I claim—

The composition made in manner and of materials substantially as hereinbefore specified.

JAMES H. W. HUCKINS.

Witnesses:
R. H. EDDY,
F. P. HALE, Jr.